July 4, 1961 C. F. WILCOX 2,991,358

DETECTION OF SIGNAL IN NOISE

Filed Feb. 26, 1958

2 Sheets-Sheet 1

INVENTOR.
CHARLES F. WILCOX
BY J. L. Whittaker
ATTORNEY

INVENTOR.
CHARLES F. WILCOX
BY J. C. Whittaker
ATTORNEY 2,991,358

DETECTION OF SIGNAL IN NOISE

Charles F. Wilcox, Santa Monica, Calif., assignor to Radio Corporation of America, a corporation of Delaware Filed Feb. 26, 1958, Ser. No. 717,608
4 Claims. (Cl. 250—20)

The present invention relates to an improved circuit for detecting a signal in the presence of noise. While not restricted thereto, the invention is particularly applicable to pulse type systems such as radar, for example.

In certain types of equipments the received signal consists of bursts of CW, as blips in a CW radar system, or the mark elements of Morse code in a communication system. The minimum duration of each burst is generally predetermined, but the time of occurrence of each burst may be random. Each burst must be detected reliably, despite the presence of fluctuation noise.

The usual technique for reliable detection of this mark/space type of signal information is first to use a narrow band wave filter to select the signal while rejecting as much of the noise as possible. The next step is to rectify the signal and, in some cases, to employ some further post-detection filtering. This is followed by a threshold bias whose magnitude is so selected with respect to the average noise amplitude that the noise peaks exceed the threshold very rarely, while the signal (plus noise) voltage has a very high probability of exceeding the threshold at least once in the duration of the burst. For any particular signal to noise ratio there is always some chance of interpreting "space" as "mark" or vice versa. To maximize the system reliability a fairly critical setting of the threshold bias voltage is required. In the case of a radar system where the presence of a target is anticipated, the noise-only threshold crossings are defined as "false alarms."

A difficulty with the above technique is that the average noise voltage may not remain constant with time, and a small variation will have a pronounced effect on the average rate of noise-only threshold crossings. To overcome this, an automatic gain control circuit is sometimes employed, whose function is to maintain the average noise voltage at a constant value.

The present invention follows a different approach. The received signal, which may be noise only or signal plus noise, is applied to a first channel tuned to the signal frequency. The same signal is also applied to a second channel, tuned to reject the signal frequency. The outputs of the two channels are rectified and integrated. The integrated voltages are preferably adjusted to a value such that, in the absence of an input signal, the output of the first or signal plus noise channel is slightly greater than that of the second or noise and unwanted signal channel (hereafter termed "noise" channel). Thus, in the absence of an input signal, when the outputs of the two channels are subtracted from one another, there is always a small amount of noise ripple present. This noise ripple is passed through a threshold circuit and the average amount of time the signal exceeds the threshold is determined. This time, which it has been found remains substantially constant in the absence of signal even with wide variations in input noise level, is converted to a count known as the false alarm rate. Any significant change in the false alarm rate is indicative of the presence of an input signal.

The manner in which the presence of signal is indicated depends upon the use of the system. For example, in a "yes-no" system, that is, one in which it is desired only to know whether or not a signal is present, the indicator may be a meter or the like. An abrupt increase in the meter reading, which is indicative of an abrupt increase in the count, means that a signal is present. A typical "yes-no" system may be, for example, an early warning radar system or a collision avoidance system. If it is desired, in addition, to know the time of occurrence of the signal, the count, whenever greater than a given value, may be converted to a pulse. In radar applications, the pulse may be displayed on the radar indicator. In communication applications, the pulses may be converted, by conventional means, to the digits or characters they represent.

The circuit described above can reliably detect signal well down in noise. Such detection is possible, for example, with signal to noise ratios of 1/10 and less.

The invention will be described in greater detail by reference to the following description taken in connection with the accompanying drawing in which.

Figures 1, 2:
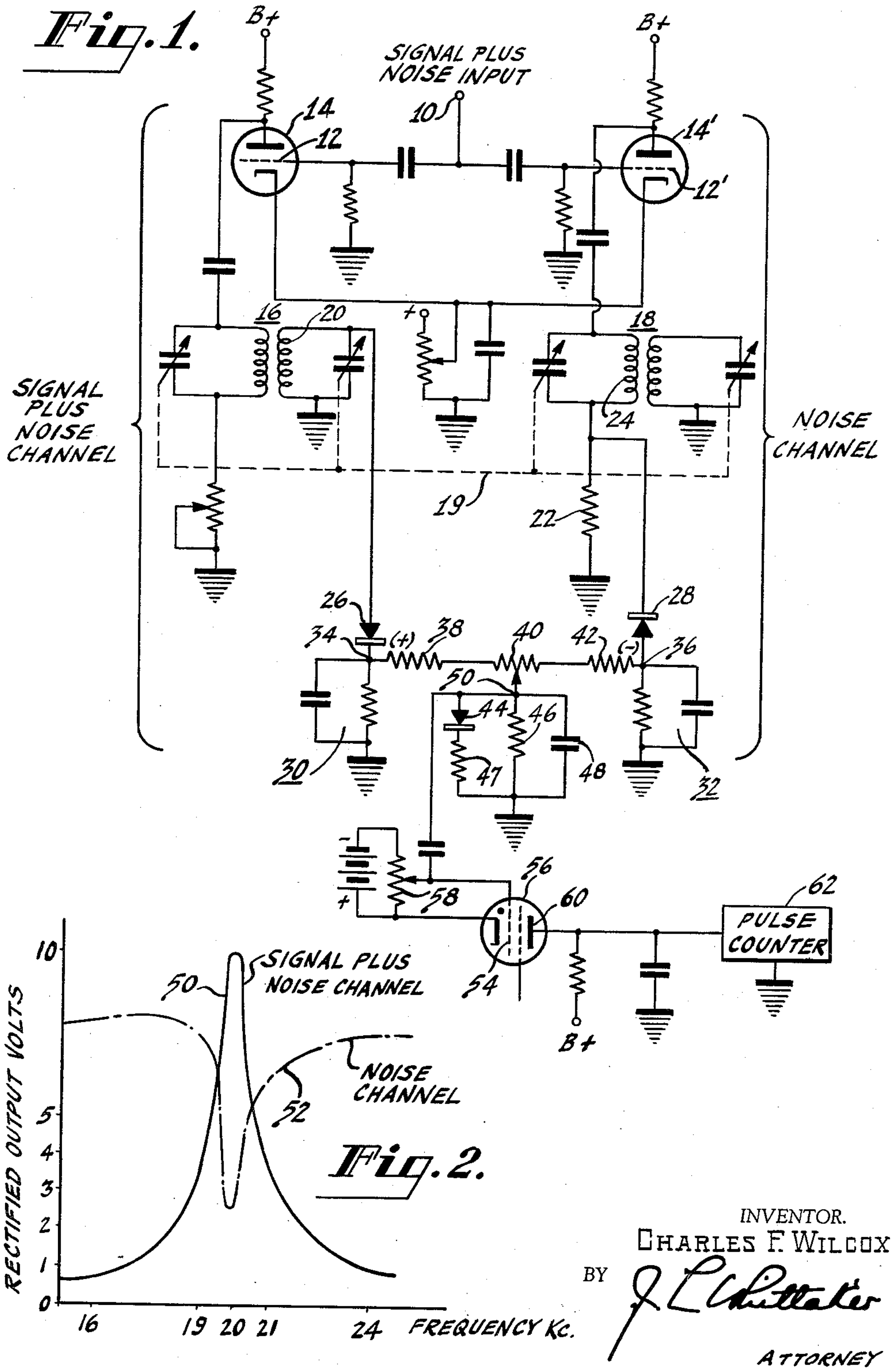
FIG. 1 is a schematic circuit diagram of a preferred form of the present invention.
FIG. 2 is a drawing of the response characteristics of portions of the circuit of FIG. 1.

Referring to FIG. 1, an input signal consisting of a desired sine wave signal, noise generated by the receiver and noise received by the receiver, is applied to input terminal 10. This signal may, for example, be the intermediate frequency output of the intermediate frequency stages of a radar receiver. The signal is applied to the control grids 12, 12' of a pair of fixed biased, untuned class A amplifiers 14, 14'. As will be explained in more detail later, amplifier 14 is in the signal plus noise channel, and amplifier 14' is in the noise channel. The output of amplifier 14 is applied to a band pass filter 16 tuned to the signal frequency. The output of amplifier 14' is applied to a similar filter 18 also tuned to the signal frequency. The filters may be tunable, as indicated by the tunable condensers, and the latter may be ganged as indicated by the dashed connection 19.

The output of filter 16 is taken from the secondary winding 20. The output of filter 18, however, is taken from across a resistor 22 connected in series with primary winding 24. Filter 18 therefore acts as a band rejection filter since at resonance the desired signal current is a minimum. Filter 16 is connected to a diode 26 which is poled to pass only positive-going signals, whereas filter 18 is connected to a diode 28 poled to pass only negative-going signals. Circuits 30 and 32 are integrators, whereby there are produced at terminals 34 and 36 positive and negative voltages, respectively. Each output includes a ripple component superimposed on the direct voltage.

The above, positive and negative voltages are applied to a subtraction circuit consisting of resistors 38, 40 and 42 and the damping circuit including diode 44, resistors 46 and 47, and capacitor 48. The function of the damping circuit is to provide high impedance damping to the noise ripple voltage present at terminal 50. The damping circuit also acts as a resistor-condenser integrator. In this connection, the time constant is made less than that of the integrators 30 and 32 used in the signal plus noise and noise channels, respectively.

The operation of the circuit, as described so far, can be understood by referring to FIG. 2. The signal plus noise channel output characteristic is shown by solid line curve 50, whereas the noise channel output characteristic is shown by dot-dash line 52. The integrated output of the signal plus noise channel is always a positive D.C. voltage, whereas the integrated output of the noise channel is always a negative D.C. voltage. The relative amplitudes of the two integrated voltages at output terminal 50 can be adjusted by adjustment of the slider on potentiometer 40. The slider is preferably adjusted to a point such that, in the absence of signal, the output of the signal plus noise channel is slightly greater than that of the output of the noise channel. In other words, the adjustment is such that, in the absence of a signal, a positive voltage appears at terminal 50. This voltage has a certain amount of ripple and, it has been found, that on a statistical basis, in the absence of signal, the percentage of time during which the ripple exceeds a given threshold voltage level is a constant. The remainder of the circuit shown in FIG. 1 converts time to a count. In other words, whenever the threshold level is exceeded, sawtooth pulses are produced in an amount depending, in each case, on the duration of time the level is exceeded.

Figure 4A:
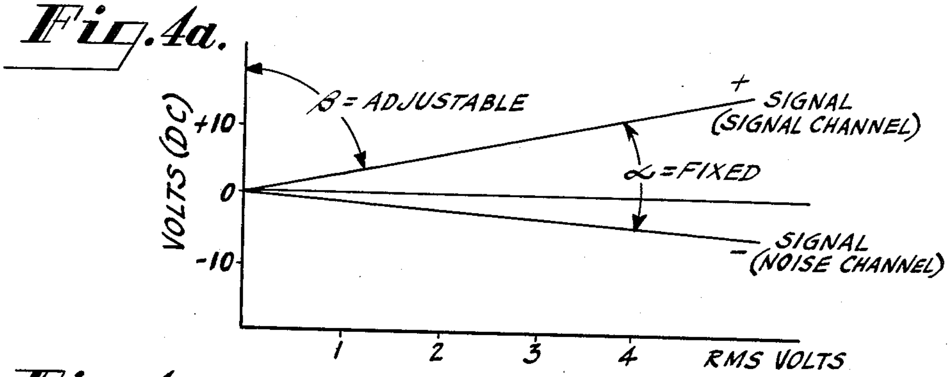
Figure 4B:
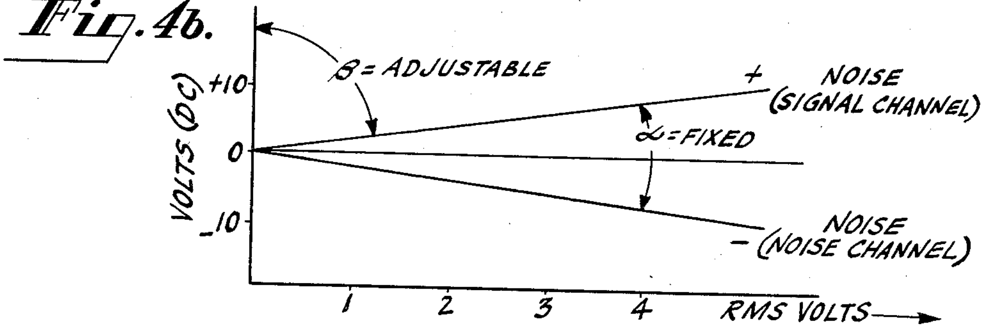

FIGS. 4*a* and 4*b* illustrate the response characteristic of the circuit of FIG. 1 for signal alone and noise alone respectively. The curves are substantially linear. The angle $\alpha$ is fixed and depends upon the primary and secondary impedances of filters 16 and 18, the total circuit Q, the transformer turns ratio and the circuit load. The angle beta is variable and is adjusted by the potentiometer 40 in the difference circuit. This adjustment controls the channel ratios which are responsible for the false alarm rate and sensitivity of the system. The adjustment is such that in the absence of signal, the positive noise voltage output of the signal channel will occasionally exceed that of the noise channel thus producing a false alarm.

Referring again to FIG. 1, terminal 50 is capacitively coupled to the control grid 54 of a thyratron 56. The thyratron and its associated circuit elements comprise a fixed frequency, sawtooth oscillator (a "clock"). The oscillator is normally maintained cut off by a fixed value of negative bias tapped from potentiometer 58 and applied to control grid 54. However, each time the noise ripple voltage at terminal 50 exceeds the bias setting, the thyratron circuit begins to oscillate and produces sawtooth pulses at anode 60. The number of pulses produced each oscillating period is determined by the duration of the period and this, in turn, is determined by the width, above the threshold level, of noise pulse applied to control grid 54. The number of pulses per given interval of time are counted by pulse counter 62. Preferably, the pulse counter includes an indicator, such as a dial, which gives the number of counts per unit of time directly.

Figure 3:
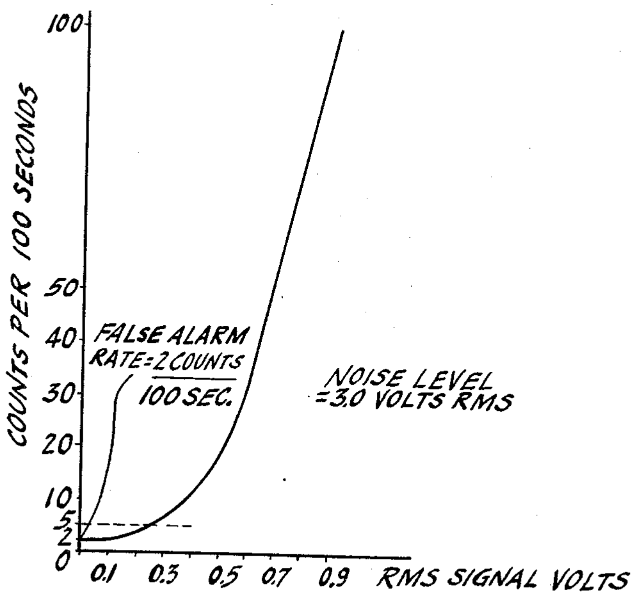
FIGS. 3, 4*a* and *b* are diagrams showing the performance of the circuit of FIG. 1.

The operation of a practical system in accordance with the present invention is shown in FIG. 3. The signal frequency employed was 20 kilocycles, and filters 16 and 18 were tuned to this frequency, as shown in FIG. 2. The noise band width was 1000 cycles centered at the signal frequency and its amplitude was maintained constant at 3 volts R.M.S. The circuit was initially adjusted to give a "false alarm" rate of 2 counts per 100 seconds in the absence of signal. Signals at different levels of amplitude were then applied to the input terminal in the presence of the three volt noise signal. It was found that an input signal of 0.2 volt in the presence of 3 volts R.M.S. of noise, a signal-to-noise ratio of 1:15, changed the count from 2 to 6. This, more than doubling of the count, is a reliable indication of the presence of the signal.

In the circuit described above, some of the circuit values which were employed were:

Integrators 30 and 32, resistor=220K, condenser=0.2 microfarad.

| | |
|---|---|
| **38, 42** | 1 megohm each. |
| **40** | 5 megohms. |
| **48** | 0.01 microfarad. |
| **46** | 1 megohm. |
| **47** | 1.1 megohms. |

What is claimed is:

1. A circuit for detecting the presence of signal in noise comprising, a first channel for passing signal plus noise; a second channel for passing noise and substantially no signal, said signal plus noise being applied to both channels; means for integrating and then subtracting the output of one channel from that of the other to obtain a noise ripple output which in the absence of signal, would be of the same polarity as in the presence of signal, said ripple exceeding a given threshold level for a predetermined percentage of time; and means for detecting an increase in said percentage of time.

2. A circuit for detecting signal in noise comprising, in combination, a first channel to which the signal and noise may be applied including a band pass filter tuned to the signal frequency; a second channel to which the signal plus noise may be applied including a filter having substantially minimum response at the signal frequency; means coupled to said channels for integrating and then subtracting the output of one from that of the other to obtain a noise ripple output which, in the absence of signal is of the same polarity as would be obtained in the presence of signal, said ripple exceeding a given threshold level a given percentage of the time; and means for detecting an increase in said percentage of the time.

3. A circuit for detecting signal in noise comprising, in combination, a first channel to which the signal and noise may be applied including a band pass filter tuned to the signal frequency; a second channel to which said signal plus noise may be applied including a filter having a rejection notch at said signal frequency; means coupled to said channels for integrating and then subtracting the output of one from that of the other to obtain a noise ripple output which, in the absence of signal is of the same polarity as would be obtained in the presence of signal, said ripple exceeding a given threshold level a given percentage of the time; and means for detecting an increase in said percentage of the time.

4. A circuit for detecting the presence of signal in noise comprising, a first channel for passing signal plus noise; a second channel for passing noise and substantially no signal, said signal plus noise being applied to both channels; means for integrating and then subtracting the output of one channel from that of the other to obtain a noise ripple output which, in the absence of signal, would be of the same polarity as in the presence of signal, said ripple exceeding a given threshold level a predetermined percentage of the time; and a thyratron oscillator biased to a value such that it does not operate when said ripple is lower than said threshold level and does oscillate when said ripple exceeds said threshold level connected to receive said ripple and the produce oscillations in response thereto each time said ripple exceeds said threshold level.

References Cited in the file of this patent

UNITED STATES PATENTS

| | | |
|---|---|---|
| 2,446,244 | Richmond | Aug. 3, 1948 |
| 2,830,177 | Taylor | Apr. 8, 1958 |
| 2,852,622 | Fedde | Sept. 16, 1958 |

FOREIGN PATENTS

| | | |
|---|---|---|
| 497,115 | Germany | May 2, 1930 |